United States Patent [19]

Borchert et al.

[11] Patent Number: 4,643,883

[45] Date of Patent: Feb. 17, 1987

[54] METHOD OF DECOLORIZING WET PROCESS PHOSPHORIC ACID

[75] Inventors: Earl E. Borchert; Robert J. Urban; Ray E. Barker, all of Terre Haute, Ind.

[73] Assignee: International Minerals & Chemical Corp., Terre Haute, Ind.

[21] Appl. No.: 821,470

[22] Filed: Jan. 22, 1986

[51] Int. Cl.$^4$ .............................................. C01B 25/16
[52] U.S. Cl. ............................. 423/321 S; 423/321 R
[58] Field of Search .................. 423/321 R, 321 S, 320

[56] References Cited

U.S. PATENT DOCUMENTS

| | | | |
|---|---|---|---|
| 1,981,145 | 11/1934 | Keller | 423/321 S |
| 3,186,793 | 6/1965 | Gillis et al. | 423/321 R |
| 3,993,735 | 11/1976 | Irani | 423/321 R |
| 4,225,568 | 9/1980 | Leveque | 423/321 S |
| 4,279,878 | 7/1981 | Maurer et al. | 423/321 R |
| 4,294,809 | 10/1981 | Hill | 423/321 R |
| 4,297,334 | 10/1981 | McConomy et al. | 423/321 R |
| 4,330,516 | 5/1982 | Winand | 423/321 R |
| 4,349,519 | 9/1982 | Hiraga et al. | 423/321 S |
| 4,369,169 | 1/1983 | Nineuil et al. | 423/321 R |
| 4,457,899 | 7/1984 | Grotyohann et al. | 423/321 R |
| 4,495,165 | 1/1985 | Gurza | 423/321 R |

FOREIGN PATENT DOCUMENTS 2813755  4/1979 Fed. Rep. of Germany ... 423/321 R
3131847  of 1981 Fed. Rep. of Germany .
5761606  of 1982 Japan .

OTHER PUBLICATIONS

Product Data, Granular Darco® L1 100+.
Johnston, "*Colorimetry of Transparent Materials,*" Journal of Paint Technology, vol. 43, No. 553, pp. 42-50, 1971.
Standard Test Method for Color of Clear Liquids (Platinum-Cobalt Scale), ASTM Designation.
Standard Methods of Testing Urethane Foam Polyol Raw Materials, ASTM ANSI/ASTM.
Standard Test Method for Color of Transparent Liquids (Gardner Color Scale), ASTM Designation.

*Primary Examiner*—Gregory A. Heller
*Attorney, Agent, or Firm*—Wendell R. Guffey; D. Byron Miller; Thomas L. Farquer

[57] ABSTRACT

A method of decolorizing wet process phosphoric acid containing organic color-imparting impurities is provided. The process includes treating the acid with a strong oxidant at a temperature in the range of about 50° to about 150° C. by slowly adding the oxidant to the acid over a period of time of at least about 3 hours. The oxidized acid then is contacted with a regenerable activated carbon, preferably in a packed column, in order to adsorb the oxidized color-imparting impurities.

20 Claims, No Drawings

METHOD OF DECOLORIZING WET PROCESS PHOSPHORIC ACID

BACKGROUND OF THE INVENTION

1. Field of the Invention

The present invention relates to the removal of color imparting impurities from purified wet process phosphoric acid. More specifically, the present invention relates to a decolorization process having improved efficiency from a cost and raw materials standpoint.

2. Description of the Prior Art

Wet process phosphoric acid is typically prepared by digesting mined phosphate ore with a strong acid, such as sulfuric acid followed by filtering and removing of gypsum crystals. The resulting crude liquor typically has a color ranging from greenish-yellow to dark brown. The colorization is thought to be caused by humic acid compounds, i.e., aromatic carbon compounds of high molecular weight, which when oxidized form highly colored quinones. These carbon-containing impurities may originate either from the mineral deposit itself and/or from additives introduced or incorporated during physical treatment of the phosphate rock, such as anti-foaming agents. In order to obtain a technical or food grade acid, the crude acid typically is purified in a continuous liquid-liquid extraction and re-extraction procedure which is well-known to those skilled in the art. See for example U.S. Pat. Nos. 4,349,519 and 4,225,568. The organic carbon content of the crude re-extracted liquor (determined by the amount of $CO_2$ obtained by oxidation of the solution) typically varies between about 0.01 to 0.1% by weight of the solution.

While the presence of color imparting organic impurities is not undesirable in all possible uses of the wet process acid, in cases such as preparation of either technical or food-grade acid, the presence of color imparting organic impurities is highly undesirable. For such applications the acid should have a color value (APHA color standard) of 30 or less.

A number of methods have been developed in the prior art for removing these color imparting organic compounds. Of these teachings, a number have suggested treating the purified wet process acid with a strong chemical oxidant, such as hydrogen peroxide, as well as by treatment with activated carbon in order to remove the organic impurities. See, for example, German Pat. No. 2,813,755; German Pat. No. 3,131,847; Japanese Pat. No. 57-61606 and U.S. Pat. No. 4,330,516.

In particular, U.S. Pat. No. 4,330,516 to Winand discloses a process for the decolorization of wet process acid. After performing a number of processing steps which are well known and used in this art including extraction and re-extraction, Winand performs a final decolorizing treatment comprising adding an oxidizing agent while heating the acid to an elevated temperature of at least 110° C., preferably at least 130° C., and subsequently adding powdered activated carbon directly to the acid in order to absorb organic impurities. Winand discloses the use of strong chemical oxidants such as chlorates and hydrogen peroxide.

Unfortunately, the processes disclosed by Winand are subject to several serious disadvantages. First, when using chlorates such as chloric acid and sodium chlorate, undesirable impurities (such as sodium and chlorine ions) are added to the acid and must be removed. Additional ion impurity removal steps add significantly to the manufacturing costs.

While the use of hydrogen peroxide as an oxidant does not contribute any undesirable ion impurities, the hydrogen peroxide constitutes an expensive raw material. Similarly, the powdered carbon absorbent also constitutes an expensive raw material which in the Winard process can only be effectively used once, and then must be filtered (an additional processing step) and discarded or regenerated.

Thus, it is an important object of the present invention to provide a more economical process for the decolorization of wet process acid utilizing significantly smaller amounts of both hydrogen peroxide and activated carbon.

SUMMARY OF THE INVENTION

These and other important objects of the present invention are met by a method of removing organic color-imparting impurities from solvent-purified wet process phosphoric acid. The acid, having a $P_2O_5$ content above about 40 wt. % and preferably in the range of 40-55% $P_2O_5$ is treated with a strong chemical oxidant containing substantially no ion impurities at a temperature in the range of about 50° C. to about 150° C. by slowly adding said oxidant to said acid over a period of 3 to 8 hours. Subsequently, the acid is contacted with a regenerable, metal-free granular activated carbon to adsorb the oxidized color-imparting organic impurities. The carbon treatment is preferably conducted at a temperature in the range of about 40° to about 100° C. by flowing the acid through a column filled with said activated carbon.

Although specific embodiments of the invention have been selected for description in the specification which follows, it will be appreciated by those skilled in the art that a wide variety of equivalents may be substituted for those specific steps and operations described. It will also be appreciated by those skilled in the art that the examples appearing hereinafter are only representative of, but do not restrict, the scope of the present invention which is defined in the appended claims.

DETAILED DESCRIPTION OF THE INVENTION

It has now surprisingly been discovered that significantly reduced amounts of oxidant and activated carbon are consumed utilizing the methods of the present invention. Specifically, it has been discovered that by slowly treating the organic impurity-containing purified wet process acid with a strong oxidant, the oxidant containing substantially no ion impurities such as sodium, calcium, magnesium, chlorine, and the like, at a temperature in the range of 50° to about 150° C. by adding said oxidant to said acid over a period of at least about 3 hours, preferably for at least about 5 hours, significantly smaller amounts of oxidant are consumed in oxidizing the organic impurities. The purified wet process acid treated in accordance with this invention is preferably the acid recovered from conventional organic extraction and reextraction procedures and similar techniques using a partially water soluble organic extractant such as isobutanol. While the oxidant is preferably added to the acid in a continuous fashion, in the broad practice of this invention multiple, small discrete doses of the oxidant can be used so as to approximate continuous addition. Adding the oxidant in a single or several relatively large doses, however, must be avoided as this leads to inefficient use of the oxidant and thus larger consumptions.

As examples of the strong oxidant containing substantially no impurities, there can be mentioned hydrogen peroxide and ozone. Although either of these substances may be used, hydrogen peroxide generally is preferred from a safety and ease of handling standpoint. The peroxide is typically added as an aqueous solution. Chemical oxidants such as chlorates are not used in practicing the present invention as they add ion impurities such as sodium and chlorine, which are difficult and expensive to remove.

It is extremely important in order to achieve the efficiency benefits of the present invention to conduct the oxidation reaction at a temperature between about 50° to about 150° C. by slowly adding the oxidant to the acid over an oxidation reaction time period of at least about 3 hours. With the use of a strong oxidant such as hydrogen peroxide or ozone, there is a greater likelihood of achieving more complete oxidation of the organic impurities and avoiding the problems of incomplete oxidation. The oxidant is typically added to the acid at a rate within the range of about $5 \times 10^{-6}$ to about $5 \times 10^{-5}$ moles oxidant/g $P_2O_5$/hr. As extended reaction time for example of greater than about 5 hours facilitates a more complete oxidation yielding more efficient use of the oxidant. If the oxidant is quickly added to the acid such that the reacion time is less than about 3 hours, the oxidant (in the case of hydrogen peroxide as the oxidant) may be partially wasted through the formation of oxygen and water.

Once the oxidizing treatment has been completed the purified wet process acid then is contacted with a regenerable, granular activated carbon in order to absorb the oxidized color-imparting impurities. The activated carbon should be metal-free since the acid tends to leach out metals contained in the carbon which then form undesirable metal ion impurities in the purified wet process acid. The regenerable activated carbon preferably is contacted with the acid by feeding the acid to a packed column containing the granular carbon. For best results the acid should be filtered before feeding to the carbon column to prevent the undesirable accumulation of debris. While the low metals content of the carbon is highly desirable in practicing the present invention, it is expected that many types of granular carbons having a low metals content would be suitable for practicing the present invention. One specific example of a suitable carbon has a mean particle diameter of about 0.9 to about 1.1 mm, a mean pore diameter of about 30 Å, a total surface area of about 1050 m²/g, an internal pore volume of about 0.8 ml/g, and an acid soluble metal ion impurities content of less than 100 ppm. Such a carbon works well in the processes of the present invention.

While the present invention is not limited to any range of flow rate, the flow rate of the wet process acid through the carbon column is typically in the range of about 0.2 to about 5.0 bed volumes/hr, preferably about 0.5 to 1.5 bed volumes/hr. The carbon treatment is conducted at a temperature within the range of about 40° to about 100° C., preferably in the range of about 60° to about 80° C.

A granular activated carbon, having a low metals content sold by ICI, Americas, Inc. under the Trademark DARCO ® LI 100+, comprises one example of a low metals content granular carbon found to be especially useful in the process of the present invention. It has been found that this type of activated carbon may be regenerated numerous times, thereby further reducing the activated carbon raw material costs. Generally, the ratio of activated carbon to treated acid expressed as $gP_2O_5/gC$, which is an expression of a quantity of acid that can flow through the carbon column before regeneration, is greater than about 50. However, since the activated carbon can be regenerated many times, the overall $gP_2O_5/gC$ ratio is greater than about 1000.

Once loaded with the oxidized carbon species, the carbon column may be regenerated by draining the acid from the bed, pumping deionized water through the column until the effluent pH rises to about 3–4 followed by an aqueous sodium hydroxide recirculation flush using, for example, a 7.5% NaOH solution recirculating through the bed while maintaining the temperature at about 70° C. (this step may be repeated 5–8 times until the resulting caustic solution becomes almost clear). The bed is then flushed with deionized water until the pH is about 10. The column is then drained and refilled with purified acid in preparation for further processing.

EXAMPLES 1–5

Purified wet process phosphoric acid recovered from solvent extraction and then concentrated, having a color value of about 2 to 7 on the Gardner Standard was treated with hydrogen peroxide at 100° C.–110° C. and subsequently pumped upwardly through a column containing DARCO ® LI 100+ activated carbon. Reaction between the acid and hydrogen peroxide was carried out by continuously adding the peroxide to the acid as a 30% aqueous peroxide solution. Examples 1–5 are summarized in Table 1.

COMPARATIVE EXAMPLES 6–7

Comparative tests were run to compare the effects of (i) oxidation alone and (ii) carbon treatment alone, with the decolorization achieved in Examples 1–5. In comparative Example 6, purified wet process phosphoric acid recovered from solvent extraction and then concentrated, was reacted with hydrogen peroxide by continuously adding the peroxide to the acid as a 30% aqueous peroxide solution for a shortened time period of only two hours. No carbon treatment was performed. The final color of the acid was APHA 15 after peroxide treatment alone.

In comparative Example 7, the purified, solvent extracted acid was subjected to carbon treatment without prior reaction with peroxide. The final color of the acid after carbon treatment alone was APHA 30. The results of comparative Examples 6 and 7 are also presented in Table 1.

TABLE 1

| | Example Nos. | | | | | Comparative Example No. | |
|---|---|---|---|---|---|---|---|
| | 1 | 2 | 3 | 4 | 5 | 6 | 7 |
| $H_2O_2$ Treatment: | | | | | | | |
| Acid Concentration (% $P_2O_5$) | 40 | 54 | 54 | 54 | 54 | 54 | 54 |

TABLE 1-continued

| | Example Nos. | | | | | Comparative Example No. | |
| --- | --- | --- | --- | --- | --- | --- | --- |
| | 1 | 2 | 3 | 4 | 5 | 6 | 7 |
| $H_2O_2$ Added ($MgH_2O_2$/g $P_2O_5$) | 10.0 | 10.0 | 8.7 | 10.0 | 3.5 | 24.0 | 0.0 |
| Treatment Time (hrs) | 5.0 | 5.0 | 6.0 | 6.0 | 6.0 | 2.0 | — |
| Color (APHA) | 25 | 25 | 100 | 100 | 100 | 15 | — |
| Temperature (°C.) | 100 | 100 | 100 | 110 | 110 | 82 | — |
| Carbon Treatment: | | | | | | | |
| Carbon Used (mg C/g $P_2O_5$) | 10 | 21 | 5 | 0.1 | 1.0 | — | 6 |
| Temperature (°C.) | 40 | 70 | — | 70 | 70 | — | 70 |
| Flow Rate (Bed volumes/hr) | 1.0 | 1.0 | 1.0 | 1.0 | 1.0 | — | 1.0 |
| No. of Bed Regenerations | 20 | 20 | 20 | 20 | 20 | — | 20 |
| Color (APHA) | 5 | 5 | 5 | 5 | 5 | — | 30 |

The carbon treated acid from Example 1 was concentrated to 54% $P_2O_5$ to give a concentrate which also had an APHA 5 color. The concentrated acid then was subjected to a heat stability test (one hour at 91° C.) and produced an acid product having an APHA 30 color. The 54% $P_2O_5$ carbon treated acid from Example 2 was subjected to a heat stability test of one hour at 91° C., producing an acid also having an APHA 30 color. The carbon treated acid product of Example 3 also had excellent heat stability characteristics.

Table 2 sets forth currently estimated costs (based on $0.70/lb $H_2O_2$ and $0.98/lb carbon) for Examples 1-7. Of course it will be understood that as raw material and other prices fluctuate, conditions providing optimum cost figures may also change.

TABLE 2

| | $H_2O_2$ Cost ($/ton $P_2O_5$) | Carbon Cost ($/ton $P_2O_5$) | Total Cost ($/ton $P_2O_5$) |
| --- | --- | --- | --- |
| Example No. | | | |
| 1 | 14.00 | 19.50 | 33.50 |
| 2 | 14.00 | 40.95 | 54.95 |
| 3 | 12.18 | 9.75 | 21.93 |
| 4 | 14.00 | 0.20 | 14.20 |
| 5 | 4.90 | 1.95 | 6.85 |
| Comparative Example No. | | | |
| 6 | 33.60 | — | 33.60 |
| 7 | — | 11.70 | 11.70 |

What is claimed is:

1. A method of decolorizing solvent extraction purified wet process phosphoric acid containing organic color-imparting impurities, comprising:
   (a) treating solvent extraction purified wet process phosphoric acid having a $P_2O_5$ content in the range of about 40-55 wt. %, with a strong oxidant containing substantially no impurities at a temperature in the range of about 50° to about 150° C., by slowly adding said oxidant to said acid over a period of at least about 3 hours; and
   (b) contacting the treated acid with regenerable, substantially acid leachable metal-free activated carbon at a temperature in the range of about 40° to about 100° C. to adsorb oxidized color-imparting impurities by flowing said acid through a column of said activated carbon.

2. The method as defined in claim 1, wherein the acid has a $P_2O_5$ content of about 54 wt. %.

3. The method as defined in claim 1, wherein the oxidant comprises an aqueous solution of $H_2O_2$.

4. The method as defined in claim 1, wherein the oxidant comprises ozone.

5. The method as defined in claim 1, wherein said activated carbon has a mean particle diameter in the range of about 0.9 to about 1.1 mm.

6. The method as defined in claim 1, wherein the acid is treated with said oxidant at a temperature of about 100°-110° C.

7. The method as defined in claim 3, wherein the $H_2O_2$ is added to the acid in an amount of about 1 to about 10 mg $H_2O_2$/g $P_2O_5$.

8. The method as defined in claim 1, wherein the oxidant comprises $H_2O_2$.

9. The method as defined in claim 1, wherein said oxidant is added at a rate within the range of about $5 \times 10^{-6}$ to about $5 \times 10^{-5}$ moles oxidant/g $P_2O_5$/hr.

10. A method of decolorizing solvent extraction purified wet process phosphoric acid containing organic color-imparting impurities, comprising:
    (a) treating solvent extraction purified wet process phosphoric acid having a $P_2O_5$ content in the range of about 40-55 wt. %, with a strong oxidant selected from the group consisting of $H_2O_2$ and ozone containing substantially no impurities at a temperature in the range of about 50° to about 110° C., by slowly adding said oxidant to said acid over a period of at least about 3 hours; and
    (b) contacting the treated acid with regenerable, substantially acid leachable metal-free activated carbon at a temperature in the range of about 40° to about 190° C. to adsorb oxidized color-imparting impurities by flowing said acid through a column of said activated carbon.

11. The method as defined in claim 10, wherein the oxidant comprises $H_2O_2$.

12. The method as defined in claim 11, wherein the oxidant comprises an aqueous solution of $H_2O_2$.

13. The method as defined in claim 12, wherein the $H_2O_2$ is added to the acid in an amount of about 1 to about 10 mg $H_2O_2$/g $P_2O_5$.

14. The method as defined in claim 10, wherein said activated carbon has a mean particle diameter in the range of about 0.9 to about 1.1 mm.

15. The method as defined in claim 10, wherein the acid is treated with said oxidant at a temperature of about 100°-110° C.

16. The method as defined in claim 10, wherein the acid has a $P_2O_5$ content of about 54 wt. %.

17. The method as defined in claim 10, wherein the oxidant is added at a rate within the range of about $5 \times 10^{-6}$ to about $5 \times 10^{-5}$ moles oxidant/g $P_2O_5$/hr.

18. A method of decolorizing solvent extraction purified wet process phosphoric acid containing organic color-imparting impurities, comprising:
  (a) treating solvent extraction purified wet process phosphoric acid having a $P_2O_5$ content in the range of about 40–55 wt. %, with $H_2O_2$ containing substantially no impurities at a temperature in the range of about 100° to about 110° C., by slowly adding said oxidant to said acid in an amount of about 1 to about 10 mg $H_2O_2$/g $P_2O_5$; and
  (b) contacting the treated acid with regenerable, substantially acid leachable metal-free activated carbon having a mean particle diameter in the range of about 0.9 to about 1.1 mm. at a temperature in the range of about 100° to about 110° C. to adsorb oxidized color-imparting impurities by flowing said acid through a column of said activated carbon.

19. The method as defined in claim 18, wherein the acid has a $P_2O_5$ content of about 54 wt. %.

20. The method as defined in claim 18, wherein the oxidant comprises an aqueous solution of $H_2O_2$.

* * * * *